Figure 1:
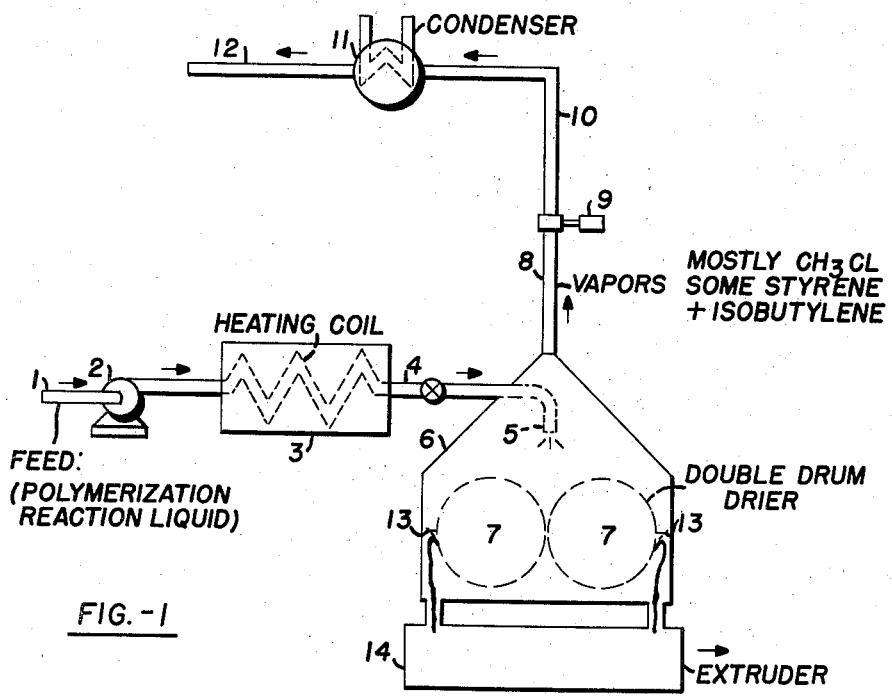

Dec. 2, 1958 — J. F. NELSON ET AL — 2,862,915
DRY RECOVERY OF ISOBUTYLENE-STYRENE COPOLYMER
Filed Sept. 17, 1953

Joseph F. Nelson
Robert F. Leary       Inventors
By W. H. Smyers  Attorney

United States Patent Office 2,862,915
Patented Dec. 2, 1958

2,862,915

DRY RECOVERY OF ISOBUTYLENE-STYRENE COPOLYMER

Joseph F. Nelson, Westfield, and Robert F. Leary, Cranford, N. J., assignors to Esso Research and Engineering Company, a corporation of Delaware Application September 17, 1953, Serial No. 380,748

8 Claims. (Cl. 260—88.1)

This invention relates to an improved method for recovering thermoplastic hydrocarbon copolymers such as styrene-isobutylene copolymers from their solutions in methyl chloride or other solvents in which they were polymerized at temperatures below 0° C. with a Friedel-Crafts catalyst, and effecting such recovery without the use of water as used commercially heretofore.

A general description of the process of copolymerizing styrene and isobutylene at low temperature with a Friedel-Crafts catalyst to make high molecular weight thermoplastic resins, is given in Patent No. 2,274,749. Polymerization temperatures to be used are generally controlled by the use of a liquid refrigerant which boils at the desired polymerization temperature. For instance, methyl chloride may be used as refrigerant to maintain a temperature of −23° C., while liquefied ethylene is used to maintain a temperature of about −100° C. to −103° C. Proportions of the monomers, e. g. styrene and isobutylene or equivalent materials, may vary over the entire range with relatively satisfactory copolymerization.

However, for a great many purposes, all of such copolymers made at a copolymerization temperature higher than about −70° C. are too low in molecular weight (i. e. they have an intrinsic viscosity of only 0.1 to 0.5). Furthermore, even higher molecular weight copolymers (i. e. having an intrinsic viscosity above 0.5), vary tremendously in their physical properties and commercial applications, according to their combined styrene content. For instance, all of the copolymers having 30% or less of combined styrene, and having intrinsic viscosities ranging from 0.6 up to 3.0 or higher, resemble high molecular weight polyisobutylene in that they have relatively low tensile strength (generally less than 500 p. s. i.), almost an indefinitely high elongation, low heat softening point (generally less than 40° C.), and a rubbery or nervy characteristic which indicates lack of good thermoplastic properties. Below 30% styrene, the polymer is not very soluble in usual chlorinated solvents, and is not adapted to handling in coils and pipes.

It should also be noted that high molecular weight copolymers having more than about 70% of combined styrene or equivalent aromatic monomer, become quite brittle when cooled down from a thermoplastic temperature down to room temperature, and therefore are not as practical for use in the present invention.

Accordingly, the present invention is adapted primarily for the finishing and recovery of styrene-isobutylene type copolymers of only the high molecular weight variety (having an intrinsic viscosity of at least 0.6) and having about 35 to 70%, preferably 40 to 65% of combined styrene or equivalent aromatic monomer. The preferred styrene-isobutylene copolymer is one having about 50 to 60% combined styrene and an intrinsic viscosity from 0.7 to 1.5 or higher.

For reasons which will be more apparent from the subsequent specification, it is preferable that the copolymers prepared should have a tensile strength of at least about 700 p. s. i., preferably at least 800 p. s. i. In general the tensile strength will be higher, the higher the combined styrene content of the copolymer. They should have an elongation less than 1,000, preferably in the range of 0 to 800. They should generally have a Williams plasticity (5 kilogram at 60° C.) of at least 200, and preferably about 300–400.

A wet-finishing technique has been used commercially with fair success for these particular copolymers. Such a process is described in Patent No. 2,537,130, and involves essentially heating the cold copolymer reaction liquid under pressure and flashing it into a flask tank in which it is rapidly agitated with water with or without a dispersing aid, whereby a slurry is formed of fine solid copolymer particles dispersed in water, these being then filtered, dried and extruded or otherwise finished. Although such a process is practical, it is relatively expensive in certain respects and it is also inconvenient and troublesome due to first mixing the polymer with water and then having to separate the polymer from the water, especially when certain uses require absolutely dry polymer (e. g. not more than 0.1% volatile matter).

The present invention offers a number of unobvious advantages over the above described wet-finishing process, first because the present dry-finishing method avoids the addition of any water and consequently avoids long term exposures to high temperatures necessary to remove water; it is also more readily adapted for reducing the cost of refrigeration by heat exchange, as will be more fully explained later.

The present invention involves heating the cold polymerization reaction mixture consisting essentially of a solution of about 10 to 30% by weight of copolymer, of the preferred type described above, in methyl or ethyl chloride, a small amount of residual catalyst and perhaps some unreacted monomers, under pressure to a temperature sufficiently elevated to flash off from 15 to 80% or 90% of the volatile solvent when the pressure is released to atmospheric, and finally vaporizing residual solvent by contacting the flashed polymer with a hot solid surface such as a double-drum drier or an extruder, etc., to vaporize the rest of the volatile solvent and any residual unreacted monomers.

The heating of the cold polymerization reaction mixture may be carried out in one or more stages, and by various heating methods. One of the simplest methods is to pump this liquid mixture under pressure through a pipe coil which is heated externally by fire, steam, oil bath or special heating media such as a mixture of diphenyl and diphenyl oxide as available commercially under the trade name Dowtherm.

A preferred method of effecting the heating of the polymerization reaction liquid is to heat-exchange it with fresh or recycled polymerization feed (isobutylene, styrene and methyl chloride solvent) which may thereby be cooled from room temperature or higher down to a temperature in the range of about −50 to −90° C., depending upon the temperature of the polymerization reaction mixture as well as the temperature of the recycled condensation and the proportions of materials. By the use of one or more such heat-exchangers, arranged either in series or parallel, or by other heating means, the temperature of the cold polymerization reaction liquid is brought up to about 50° F. to 100° F., under a pressure of about 50 to 125 p. s. i. g. The liquid may then be further heated, by other means such as mentioned above, up to a temperature above 200° F., and preferably up to about 250° F. The pressure must, of course, be correspondingly raised up to the range of about 300 to 650 p. s. i. g.

The flashing after the final heating step, may be accomplished in various ways. For instance, the hot liquid mixture may be flashed directly to low pressure by passing it through an orifice or spray nozzle, in such a way that the released methyl chloride vapors (along with residual unreacted monomers such as styrene and isobutylene) may be readily drawn off and passed through a condenser, preferably using a pump or compressor to assist in this transfer of the vapors from the flash chamber to the condenser, for recycling the condensate, after suitable cooling, to the polymerization reactor. The flashing is also preferably carried out so as to collect residual solid or liquid polymer-containing particles in a convenient manner, such as on the hot metal surfaces of a double drum drier, or directly into a heated extruder. If a double drum drier is used, the temperature of the hollow metal drums should be sufficiently high to keep the copolymer particles above the thermoplastic temperature so that the soft, semi-fluid polymer forms a film which readily spreads to a uniform thickness where the two rolls come close together, and then is readily scraped off by a scraper blade located so as to remove the polymer from the drum after it has been heated for the desired portion of a revolution of the drum. It is preferable to remove the copolymer as a continuous sheet, so that after passing over an outside roller it may then either be cooled and wound up in a coil for storage or shipment, or it may be passed to an extruder and pelletizing machine, or finished in any other desired manner.

The solvent content of the polymer after flashing will of course depend on the temperature attained and the solids content before flashing, as well as the pressure after flashing. Increasing the temperature or solids content before flashing or decreasing the pressure after flashing, reduces the solvent content of the flashed material. In a modification of the process of this invention, the solids content of the solution before flashing is increased by adding heat to the solution and bleeding off solvent vapor at constant pressure. This can readily be done in a jacketed vessel with a heating medium in the jackets, partly filled with the polymer solution, and equipped with a valve for bleeding off solvent vapor while maintaining an essentially constant pressure in the vessel. Alternately, the polymer solution from such a vessel can be recirculated through a reboiler. In this way it is possible to obtain a polymer almost free of solvent after flashing.

Polymers containing less than 15-20 wt. percent solvent after flashing are in general suitable for finishing either in an extruder or on the double drum drier. Polymers with more than this amount of solvent (up to 500 wt. percent on solids) are not suitable for finishing in the extruder, since they are too soft to be worked satisfactorily by the screw, and should be finished on the drum drier.

The nature of the Friedel-Crafts catalyst to be used, in accordance with this invention, depends upon the ultimate use or application of the resulting polymer. If it is desirable for the polymer to not contain any residual catalyst, then gaseous boron fluoride, or a solution thereof in methyl chloride, should be used as catalyst, because in this way the gaseous boron fluoride will be liberated during the flashing operation, along with the methyl chloride vapors, and any residual traces of boron fluoride will be driven off during the final working or other contact with hot metal surfaces. The temperature of this final hot working should be maintained above about 212° F., and preferably above 120° C. the temperature at which the copolymer is in its best plastic working condition, i. e. completely softened, and with substantially zero Williams plasticity recovery.

For some types of uses, it is not objectionable to have a small amount of aluminum chloride catalyst remaining in the polymer. Accordingly under such circumstances, it is not necessary to make any effort to remove residual catalyst, or reduce the amount thereof, or to neutralize it in any way. However, for a number of other purposes, it may be desirable to inactivate the residual catalyst, and accordingly if aluminum chloride has been used, residual traces thereof may be inactivated or neutralized by adding a small amount of a metal oxide such as magnesium oxide, or a metal carbonate such as calcium carbonate, or various amines such as quaternary ammonium hydroxides. Any of these materials neutralize the formation of hydrochloric acid due to hydrolysis of aluminum chloride.

When aluminum chloride, preferably dissolved in methyl chloride, is used as polymerization catalyst for making a styrene-isobutylene type copolymer at low temperature, and then heated up under pressure and flashed, according to the present invention, there is likely to be a small amount in the range of about 0.01 to 0.5% by weight, of aluminum chloride present in the styrene-isobutylene copolymer after evaporation of the methyl chloride solvent and any unreacted isobutylene and styrene. Under conditions permitting hydrolysis of this residual aluminum chloride, with the resulting formation of HCl, it may be desirable to add a basic or neutralizing substance to the copolymer solution prior to the heating and evaporization.

In carrying out the present invention, other polymerization monomers may be used instead of the specific ones discussed above, namely, styrene and isobutylene. Instead of styrene, one may use paramethylstyrene, alphamethylparamethylstyrene, paraethylstyrene, various ring halogenated styrenes such as parachlorstyrene, parabromstyrene, vinyl naphthalene, indene, or other polymerizable monoolefinic compounds having an aromatic nucleus. Instead of isobutylene, other olefins having 3 to 6 carbon atoms may be used, preferably isoolefins, such as methyl-2-butene-1.

Instead of methyl chloride as solvent, one may use other lower alkyl halides such as ethyl chloride, or propyl chloride, or even inert unsaturated halide such as vinyl chloride.

Having thus described the general principles of this invention, several further examples of different modifications of the invention will now be described, in reference to the accompanying drawings, which are given for the sake of illustration but without intention to limit the invention to the specific modifications illustrated.

Figure 1 represents a very simple modification of the invention, using a direct 1-stage heating, and flashing directly onto a final hot metal surface.

Referring particularly to Figure 1, a suitable feed liquid which is a cold polymerization reaction liquid as described above, is fed in through line 1, through pump 2, heater 3, pressure reducing valve 4, spray nozzle 5 into the flash chamber 6, which in this case also houses the double drum drier 7. From this chamber the flashed vapors which consist mostly of methyl chloride with a small amount of unreacted styrene and isobutylene, and boron fluoride gas (if such catalyst was used), are withdrawn overhead through line 8, compressor 9, line 10, and condenser 11 from which the condensate is passed by line 12 either for recycling back to the polymerization reactor (not shown), with or without cooling by means not shown, and with or without any purification treatment which may be considered desirable, or may be passed into a suitable storage vessel, not shown, for future use. In the flash chamber 6, when the vapors are flashed off from the heated polymerization reaction liquid issuing from the spray nozzle 5, residual polymer particles impinge on the hot metal surfaces of the double drum drier 7, and as the drums rotate they become coated with polymer which may tend to accumulate if the drums are set close together. This effects a working of the plastic polymer and results in spreading a thin fairly uniform layer of polymer on each drum, and this, after being subject to the heated surface for a half a revolution or so, is then removed from the drum by the scraper blades 13, and the resulting film or sheet of hot plastic polymer is led out from the flash chamber and fed into the extruder 14, and pelletizing machine (not shown), or finished in any other desired manner. If desired, the polymer sheet or extruded rods, or pellets, etc. may be cooled by any desired means (not shown) such as by air cooling, or water spraying, followed by drying, etc.

Figure 2:
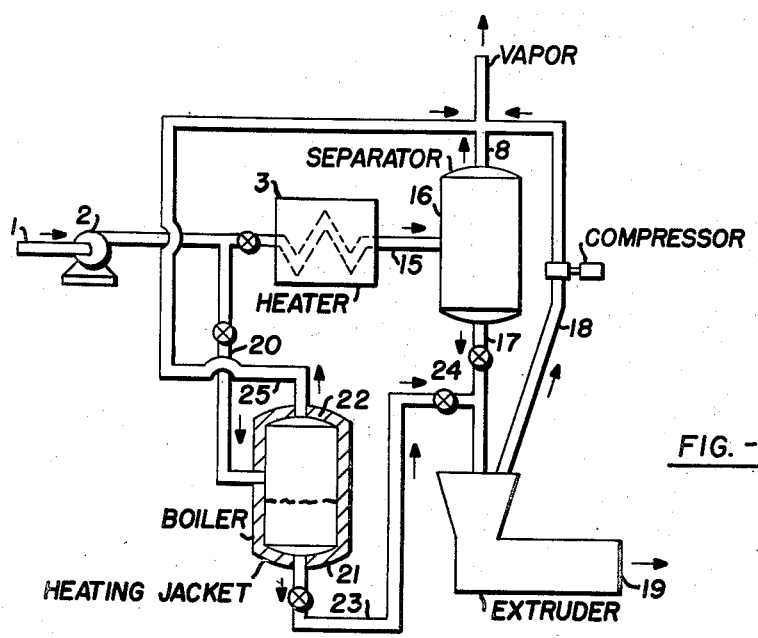

Referring now to Figure 2, cold polymerization reaction liquid, coming through line 1, is pumped by means of pump 2 up to a suitable pressure such as 300 p. s. i. g., through either one of two alternate courses. One is through the heating coil 3, to heat it to a suitable temperature, e. g. 200° F., and line 15 into the liquid-vapor separator 16, from which any vapors separating are taken overhead through line 8, while the liquid phase is flashed through valve 17 into the mouth of extruder 14, from which the vapors may also be withdrawn overhead through line 18, and from which substantially vapor-free hot plastic polymer is withdrawn through the extruder exit 19, which may be a die of any desired shape.

Alternatively, instead of having the cold reaction liquid pumped through heating coil 3, it may be passed through line 20 into boiler 21 heated by means of a heating jacket 22 to a desired temperature, e. g. 200° F., and kept boiling at that temperature under a suitable constant pressure, such as 300 p. s. i. g. until the desired substantial amount of methyl chloride vapors have been removed and a polymer solution of the desired concentration has been obtained, and then the latter is discharged through line 23 and flashing valve 24 into the mouth of extruder 14. Vapors from the boiler 21 are withdrawn overhead through line 25.

The vapors coming from any of these lines 8, 18 or 25 are preferably condensed and recycled, as explained in connection with Figure 1.

The flashing through valves 17 and 24 should be substantially down to atmospheric pressure, e. g., about 0–5 p. s. i. g.

The following experimental data is given to further explain the operation and advantages of the invention.

EXAMPLE 1

A mixture of 45 parts by weight of styrene, 55 parts of isobutylene and about 900 parts of methyl chloride (all by weight) was polymerized with a catalyst consisting of aluminum chloride dissolved in methyl chloride, at a temperature of about −100° C., to yield a 10% solution of styrene-isobutylene copolymer in methyl chloride. The solution was transferred to a Dry-Ice (solidified carbon dioxide) cooled blow case, from which a stream at 80 lbs. per square inch pressure was let through a warming coil, which was heated by warm water to about 20° C. The warmed solution was allowed to flash through a valve, the unevaporated material falling between the rolls of a double drum drier heated by 75 lbs. per square inch of steam pressure, which gave the metal drum surfaces a temperature of about 160° C. Only a small amount of solvent (about 15 to 20 percent) was flashed off, and a vigorously boiling mixture was accumulated between the coils. The clearance could be adjusted, however, so that no liquid came through. Hot, solvent-free styrene-isobutylene copolymer was scraped from the surfaces of the drums continuously by a blade scraper.

EXAMPLE 2

The following data show that magnesium oxide, calcium carbonate, and a commercially available quaternary ammonium hydroxide known as "Triton B. N. E.," all successfully neutralize formation of HCl. A styrene-isobutylene copolymer of about 50% combined styrene, and intrinsic viscosity about 0.8, which had been polymerized in the presence of methyl chloride, using as catalyst a solution of aluminum chloride in methyl chloride, and then heated and dried to remove all volatile materials, was compounded with one part by weight of each of the above-mentioned three different neutralizing agents, per 100 parts by weight of the copolymer, and then subjected to numerous physical tests. A control sample without any neutralizing agent, was also tested for comparison. In each case, 5 parts by weight of Acrawax B, a high molecular weight modified ester wax, which is a polyamide of higher fatty acids of about 10 to 20 carbon atoms, was used as processing aid. The results of these tests are given in the table:

*Table I*

| | | | | |
|---|---|---|---|---|
| Copolymer | 100 | 100 | 100 | 100 |
| Acrawax B | 5 | 5 | 5 | 5 |
| MgO | | 1 | | |
| Calcium carbonate | | | 1 | |
| Triton B NE | | | | 1 |
| Williams plasticity, Recovery, 5 kg load: | | | | |
| 50° C | 316–31 | 315–28 | 320–27 | 314–24 |
| 70° C | 179–10 | 184–11 | 167–8 | 144–10 |
| Tensile-elong., Shore (molded slab) | 800–600–73 | 940–580–73 | 880–550–60 | 930–620–76 |
| Burst strength, Mullens, hydrostatic 25# coating on 55# kraft paper: | | | | |
| Unaged | 34.5 | 36.3 | 34.3 | 34.0 |
| Aged 64 hr./100° F./95% R. H. | 29.2 | 35.3 | 34.7 | 35.5 |
| Tear strength, Elmendorf, 25# coating on 55# kraft paper: | | | | |
| Unaged | 6.8 | 6.4 | 7.0 | 6.1 |
| Aged 64 hr./100° F./95% R. H. | 5.7 | 6.3 | 7.4 | 6.2 |
| Moisture vapor permeability, gr. $H_2O$/100 sq. in./24 hrs. at 100° F., 95% R. H. 25# resin coating: | | | | |
| Uncreased | 0.8926 | 0.6039 | 0.5166 | 0.7742 |
| Creased | 1.0297 | 0.7138 | 0.5598 | 0.7920 |

These tests show that the use of any one of these three neutralizing agents, namely, magnesium oxide, calcium carobnate and quaternary ammonium hydroxide, successfully prevented the reduction in burst strength and tear strength which normally occurs in kraft paper coated with a film of copolymer containing the residual aluminum chloride, on aging (for 64 hours at 100° F. and 95% relative humidity). These materials also reduce the moisture vapor permeability of uncreased and creased samples of copolymer-coated papers. On the other hand, these neutralizing agent additives had no substantial effect on either the Williams plasticity or the tensile, elongation and shore hardness.

It is not intended that this invention be limited to the specific modifications which have been given merely for the sake of illustration, but only by the appended claims in which it is intended to claim all novelty inherent in the invention, as well as all modifications coming within the scope and spirit of the invention.

What is claimed is:

1. A non-aqueous process of recovering high molecular weight thermoplastic styrene-isobutylene copolymers having a combined styrene content of about 40 to 70% and having an intrinsic viscosity above 0.5, from the cold methyl chloride solution in which said copolymers were polymerized at a temperature below −70° C. with a Friedel-Crafts catalyst, which comprises heating the cold polymerization reaction liquid, containing 10–30% of said copolymers dissolved therein under a pressure of at least 50 p. s. i. g. to a temperature of at least 50° F. and flashing it into a closed flash chamber from which about 15–90% of the methyl chloride and other volatile vapors are withdrawn, condensed and recycled for use in further polymerization reactions, and in which the desolventized copolymer is collected on the hot rotating metal surfaces of a double drum drier having a temperature above 212° F., and removing substantially solvent-free copolymer in a hot, thermoplastic condition from said drum drier.

2. Process according to claim 1 in which boron fluoride is the Friedel-Crafts catalyst and is vaporized and recondensed along with methyl chloride solvent.

3. A non-aqueous process of recovering high molecular weight thermoplastic styrene-isobutylene copolymers having a combined styrene content of about 45 to 65% by weight and having an intrinsic viscosity of about 0.6 to 1.0, said copolymers having a tensile strength of at least about 700 p. s. i., and elongation of 0 to 800 and a Williams plasticity of at least 200, from their low temperature Friedel-Crafts polymerization liquid containing 10–30% of said copolymers dissolved in methyl chloride as solvent, and containing residual boron fluoride catalyst, which consists essentially in pumping said cold polymerization reaction liquid under a pressure of at least about 200 p. s. i. through heating means by which the temperature thereof is raised to a temperature of at least 200° F., and then flashing the resultant hot mixture down to substantially atmospheric pressure, in the range of 0 to 5 p. s. i. g., to remove about 15 to 90% of the methyl chloride and other volatile substances originally present in the cold polymerization reaction liquid, and removing residual solvent by hot working at a temperature above 212° F.

4. Process according to claim 3 in which the flashed copolymer is subjected to hot working in an extruder maintained at a temperature of at least 200° F., to completely remove any residual volatile materials.

5. Process according to claim 3 applied to the recovery of a styrene-isobutylene copolymer of about 60% combined styrene and intrinsic viscosity of about 0.7.

6. A non-aqueous process of recovering low temperature Friedel-Crafts high molecular weight thermoplastic olefin-aromatic copolymers, having about 35–70% of combined aromatic monomer and having an intrinsic viscosity of about 0.6 to 3.0, from their cold polymerization reaction liquid containing about 10–30% of said polymers dissolved in a volatile lower hydrocarbon halide solvent having 1 to 3 carbon atoms, which comprises heating said reaction liquid under a pressure of about 300 to 600 p. s. i. g. to a temperature of about 50–250° F., said temperature being substantially above the atmospheric boiling point of said solvent, flashing the hot solution down to substantially atmospheric pressure, to flash off about 15–90% of the solvent and to leave a more viscous polymer solution better adapted to hot-working than before said flashing, and removing residual solvent by hot-working.

7. A non-aqueous process of recovering high molecular weight thermoplastic low temperature Friedel-Crafts copolymers of an alkene of 3 to 6 carbon atoms and a monoolefinic polymerizable organic compound containing an aromatic nucleus, said copolymer having about 40–65% of combined aromatic monomer and having an intrinsic viscosity of about 0.6–3.0, from the cold polymerization reaction liquid in which said copolymers were polymerized at a temperature at least as low as −70° C. with a Friedel-Crafts catalyst, which comprises pumping said cold polymerization reaction liquid containing 10 to 30% of said polymers dissolved in a volatile lower alkyl halide solvent having 1 to 3 carbon atoms, under pressure through a heating coil, in heat exchange with fresh polymerization feed to be cooled and/or recycle vapors to be condensed, to heat up the polymerization reaction liquid to a temperature at least 50° F. above the boiling point of the solvent, and then flashing it down to 0–5 p. s. i. g. into a flash chamber from which about 15–90% of the solvent and other volatile vapors are removed overhead, condensed and recycled through said heat exchanger for further use as polymerization feed, and from which flash chamber the desolventized copolymer is discharged onto a hot metal surface having a temperature about 120° C. and subjected to working in a thermoplastic condition for release of final traces of solvent and other volatile materials.

8. Process according to claim 7 in which the desolventized polymer from the flash chamber is discharged directly into a hot extruder maintained at a temperature at least as high as the softening point of said thermoplastic copolymer.

References Cited in the file of this patent
UNITED STATES PATENTS
2,537,130   Green _____ Jan. 9, 1951

OTHER REFERENCES

Perry: "Chemical Engineer's Handbook," 585, 800, 863–5, McGraw-Hill (1950).